(12) United States Patent
Ojima et al.

(10) Patent No.: US 11,155,120 B2
(45) Date of Patent: Oct. 26, 2021

(54) STAGE-CORRESPONDING CASTER DEVICE

(71) Applicant: YUEI CO., LTD., Higashi-Osaka (JP)

(72) Inventors: Kota Ojima, Higashi-Osaka (JP); Tomoki Hada, Higashi-Osaka (JP)

(73) Assignee: YUEI CO., LTD., Higashi-Osaka (JP)

( * ) Notice: Subject to any disclaimer, the term of this patent is extended or adjusted under 35 U.S.C. 154(b) by 0 days.

(21) Appl. No.: 16/650,251

(22) PCT Filed: Jun. 20, 2018

(86) PCT No.: PCT/JP2018/023482
§ 371 (c)(1),
(2) Date: Mar. 24, 2020

(87) PCT Pub. No.: WO2019/111432
PCT Pub. Date: Jun. 13, 2019

(65) Prior Publication Data
US 2021/0213778 A1    Jul. 15, 2021

(30) Foreign Application Priority Data
Dec. 7, 2017 (JP) .............................. JP2017-234796

(51) Int. Cl.
*B60B 33/00* (2006.01)
*B62B 5/02* (2006.01)

(52) U.S. Cl.
CPC ...... *B60B 33/0042* (2013.01); *B60B 33/0015* (2013.01); *B60B 2900/551* (2013.01); *B62B 5/023* (2013.01)

(58) Field of Classification Search
CPC .............. Y10T 16/218; B60B 33/0042; B60B 33/0015; B60B 33/0023; B60B 2900/551;
(Continued)

(56) References Cited

U.S. PATENT DOCUMENTS 2,123,707 A * 7/1938 Bloch ................... B60B 33/045
16/44
4,467,496 A * 8/1984 Gregg ................... B60B 33/045
16/18 B
(Continued)

FOREIGN PATENT DOCUMENTS

JP    1993-56502 U    7/1993
JP    56502/1993 U    7/1993
(Continued)

OTHER PUBLICATIONS

International Search Report for International Application No. PCT/JP2018/023482 dated Sep. 11, 2018 (2 sheets, 1 sheet translation, 3 sheets total).
(Continued)

*Primary Examiner* — Chuck Y Mah
(74) *Attorney, Agent, or Firm* — Kratz, Quintos & Hanson, LLP

(57) ABSTRACT

To provide a stage-corresponding caster device being entirely compact, able to smoothly and stably work, and able to easily get over a stage end face, a holder main body 1 attached to an attached member B and having a pair of left and right side wall portions 10, a main wheel supporting member 2 in which the main wheel 7 is pivoted to a lower portion 2b and an upper portion 2a is pivoted to the holder main body 1, a sub wheel supporting member 3 in which the sub wheel 8 is pivoted to a front portion 3c and a rear portion 3d is pivoted to the main wheel supporting member 2 coaxially with the main wheel 7, and a slide roller 30 attached to the sub wheel supporting member 3 on a forward position to the main wheel 7, are provided; and the holder main body 1 has a guiding groove 13 inclined backward and downward in side view on the side wall portion 10 to guide the slide roller 30, the front portion 3c of the sub wheel supporting member 3 is oscillated downward by contact of
(Continued)

the main wheel 7 with the stage end face Ja, the sub wheel 8 is pressed to the stage upper face Jb, and the main wheel 7 climbs over the stage end face Ja.

4 Claims, 7 Drawing Sheets

(58) Field of Classification Search
CPC .......... B62B 5/02; B62B 5/021; B62B 5/026; B62B 5/023
See application file for complete search history.

(56) References Cited

U.S. PATENT DOCUMENTS

| | | | |
|---|---|---|---|
| 6,454,065 B1 * | 9/2002 | Chen .................. | A45C 5/14 16/18 B |
| 6,935,447 B2 * | 8/2005 | Bierma ................ | B62B 5/023 180/8.2 |
| 7,866,430 B2 * | 1/2011 | Kakinuma .......... | B62K 11/007 180/218 |
| 8,650,710 B1 * | 2/2014 | Waggener ........... | B60B 33/0078 16/18 B |
| 2006/0113733 A1 * | 6/2006 | Kazaoka ................ | B62B 5/025 280/5.24 |
| 2006/0267295 A1 * | 11/2006 | You ..................... | B60B 33/0078 280/5.28 |
| 2009/0172915 A1 * | 7/2009 | Hunziker ............... | B60B 1/006 16/46 |

FOREIGN PATENT DOCUMENTS

| | | | |
|---|---|---|---|
| JP | 11001102 A | * | 1/1999 |
| JP | 2002035039 A | * | 2/2002 |
| JP | 2004042685 A | * | 2/2004 |
| JP | 2016-203654 A | | 12/2016 |

OTHER PUBLICATIONS

Written Opinion of the International Searching Authority for International Application No. PCT/JP2018/023482 dated Sep. 11, 2018 (4 sheets).

* cited by examiner

STAGE-CORRESPONDING CASTER DEVICE

FIELD OF THE INVENTION

This invention relates to a stage-corresponding caster device.

BACKGROUND ART

Conventionally, a stage-corresponding caster device, provided with a sub wheel to contact a stage upper face when a main wheel contacts a stage end face, is provided with a holder main body fixed to a pallet of a carriage to hold the main wheel as to freely rotate and freely move back and forth in horizontal directions, a sub wheel supporting member of which front portion is pivoted to the sub wheel and of which rear portion is pivoted to the main wheel, a slide roller pivoted to the sub wheel supporting member coaxially with the sub wheel, and an elevation guide having a guiding inclined face to guide the slide roller and fixed to a front portion of the holder main body, and, both end portions of an axle of the main wheel are inserted to front and rear horizontal guiding holes formed on the holder main body to make the main wheel freely move back and forth in horizontal directions, and the sub wheel supporting member and the sub wheel are moved up and down with the back and forth horizontal movement of the main wheel (refer to Patent Document 1, for example).

PRIOR ART DOCUMENT

Patent Document

Patent document 1: Japanese Patent Provisional Publication NO. 2016-203654.

OUTLINE OF THE INVENTION

Problems to be Solved by the Invention

However, the above-described conventional stage-corresponding caster device has a problem that longitudinal dimension of the holder main body is long because the main wheel must be greatly moved back and forth in horizontal directions to move the sub wheel up and down. And, there is also a problem that torsion as to escape the main wheel (as to make an end portion and another end portion of the axle on different front and rear positions) is generated when the main wheel contacts the stage end face even with slight inclination in top view, and the caster can't smoothly work. And, it is difficult to get over the stage end face when the carriage is running without strong force.

Therefore, it is an object of the present invention to provide a stage-corresponding caster device being entirely compact, able to smoothly and stably work, and able to easily get over the stage end face.

Means for Solving the Problems

The stage-corresponding caster device relating to the present invention is a stage-corresponding caster device, having a sub wheel which contacts a stage upper face when a main wheel contacts a stage end face, in which a holder main body attached to an attached member and having a pair of left and right side wall portions, a main wheel supporting member in which the main wheel is pivoted to a lower portion and an upper portion is pivoted to the holder main body, a sub wheel supporting member in which the sub wheel is pivoted to a front portion and a rear portion is pivoted to the main wheel supporting member coaxially with the main wheel, and a slide roller attached to the sub wheel supporting member on a forward position to the main wheel, are provided; and the holder main body has guiding groove inclined backward and downward in side view on the side wall portion to guide the slide roller, the main wheel supporting member is oscillated backward and the sub wheel supporting member is moved backward by contact of the main wheel with the stage end face, the slide roller is guided by the guiding groove to oscillate the front portion of the sub wheel supporting member downward, the sub wheel is pressed to the stage upper face, and the main wheel climbs over the stage end face.

And, in a normal running posture in which the main wheel does not contact the stage end face, a first pivot axis on a pivoted portion of the main wheel supporting member and the holder main body is disposed on a rear and upper position to a second pivot axis on a pivoted portion of the main wheel supporting member and the main wheel to make an oscillation standard line, connecting the first pivot axis and the second pivot axis in side view, in a forward and downward inclined posture; and the oscillation standard line in the forward and downward inclined posture is switched to a backward and downward inclined posture through a vertical posture when the main wheel contacts and climbs over the stage end face.

And, the main wheel supporting member is an inverted U-shaped having a pair of left and right supporting piece portions to which the main wheel is pivoted, and an upper wall portion connecting upper portions of the pair of left and right supporting piece portions.

And, the guiding groove is formed in an arc shape convex forward and downward in side view.

Effects of the Invention

According to the present invention, the attached member such as carriage, walking frame, shopping cart, etc. and the main wheel can be pushed up by making the sub wheel contact the stage upper face with strong force. Therefore, the user doesn't need to run and lift up the attached member with strong force, and the attached member can get over the stage end face efficiently with small force (easily and lightly). The entire device can be made compact with short longitudinal dimension. Stable stage climbing function can be obtained with smooth movement of the main wheel and the sub wheel.

EMBODIMENTS OF THE INVENTION

Figure 1:
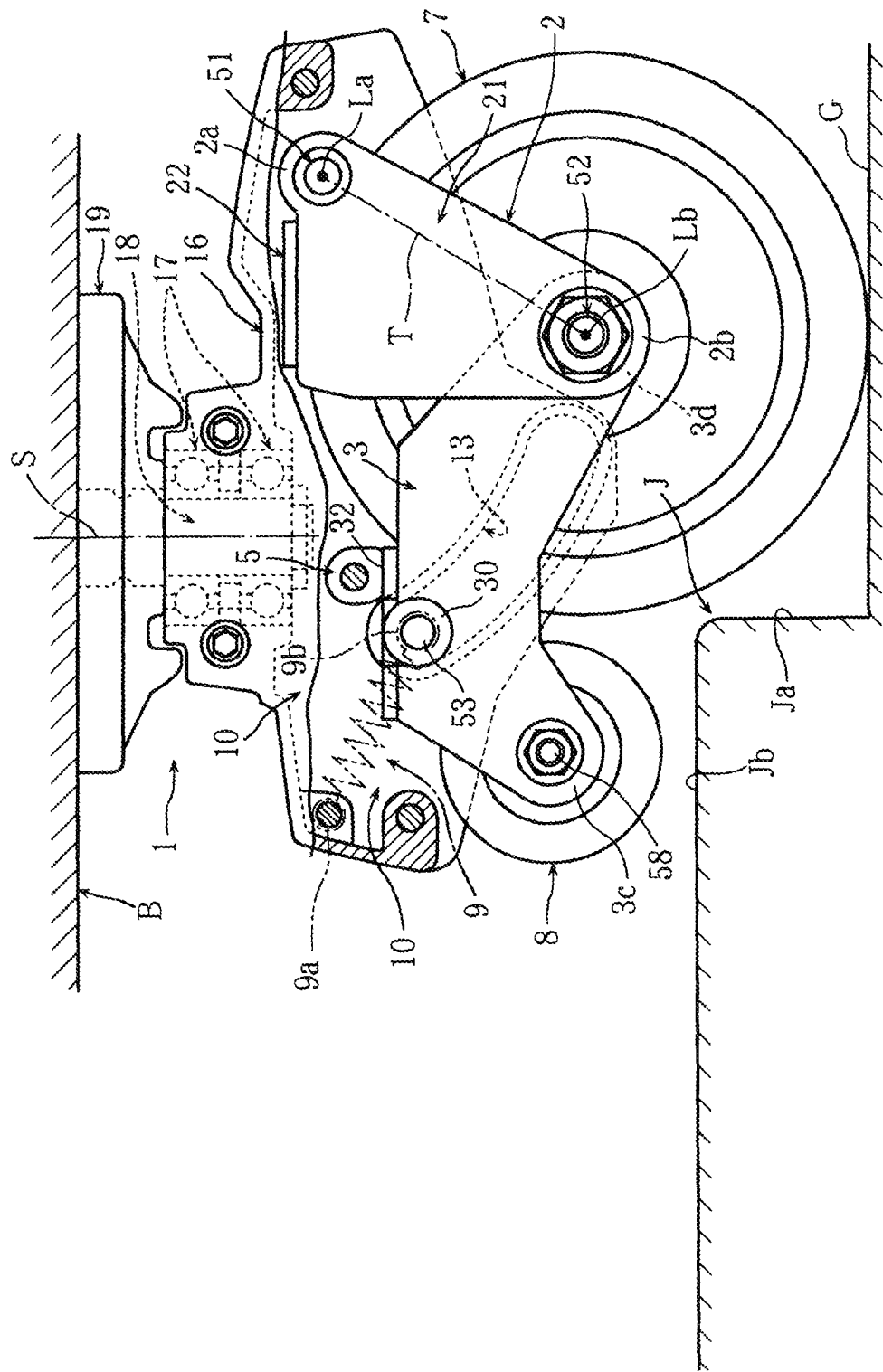
FIG. 1 A side view with cross section of principal portions of an embodiment of the present invention.

The present invention will now be described according to the embodiments shown in the drawings.

As shown in FIG. 1, a stage-corresponding caster device relating to the present invention is provided with a holder main body 1 attached to an attached member B such as a carriage, a walking frame, etc., a main wheel supporting member 2 in which the main wheel 7 is pivoted to a lower portion 2b and an upper portion 2a is pivoted to side wall portions 10 of the holder main body 1, a sub wheel supporting member 3 in which the sub wheel 8 is pivoted to a front portion 3c and a rear portion 3d is pivoted coaxially with the main wheel 7, and a slide roller 30 attached to the sub wheel supporting member 3 on a position front of the main wheel 7 and rear of the sub wheel 8.

Further, an elastic pushing member 9 such as a tensile spiral spring (shown with a tow-dot broken line in FIG. 1 through FIG. 6), of which an end portion 9a is attached to a front portion of the holder main body 1 and another end portion 9b is attached to the sub wheel supporting member 3, is provided.

And, a first pivot shaft 51 horizontal to pivot the main wheel supporting member 2 to the holder main body 1 as to freely oscillate, a second pivot shaft (main axle) 52 horizontal to pivot the main wheel 7 to the main wheel supporting member 2 as to freely rotate and to pivot the sub wheel supporting member 3 to the main wheel supporting member 2 as to freely oscillate, a pivot supporting shaft (sub axle) 58 horizontal to pivot the sub wheel 8 to the sub wheel supporting member 3 as to freely rotate, and a roller shaft 53 horizontal to attach the slide roller 30 to the sub wheel supporting member 3 as to freely rotate, are provided.

And, in a normal running posture in which the main wheel 7 does not contact a stage end face Ja (running on a flat face G in front of the stage), a first pivot axis La on a pivoted portion (the first pivot shaft 51) of the main wheel supporting member 2 and the holder main body 1 is disposed on a rear and upper position to a second pivot axis Lb on a pivoted portion (the second pivot shaft 52) of the main wheel supporting member 2 and the main wheel 7. And, an imaginary straight line connecting the first pivot axis La and the second pivot axis Lb in side view (shown in a one-dot broken line in FIG. 1 through FIG. 6) is called an oscillation standard line T, and the oscillation standard line T is in a forward and downward inclined posture in the normal running posture.

Figure 7:
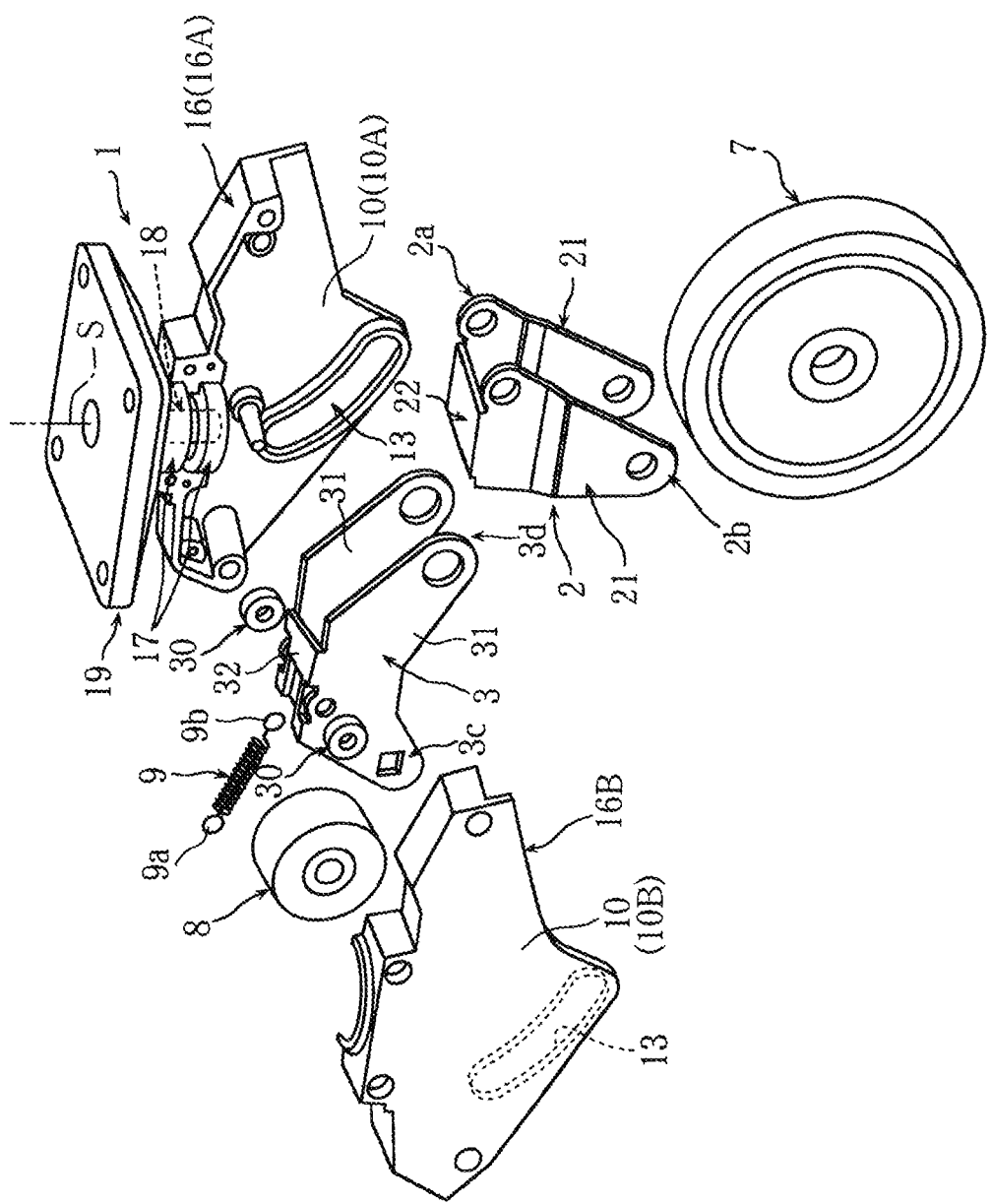
FIG. 7 A perspective view with partial explosion of principal portions.

As shown in FIG. 1 and FIG. 7, the holder main body 1 is provided with an attachment member 19 having a base portion fixed to the attached member B (not shown in FIG. 7), and a casing member 16 attached to the attachment member 19 through a swing shaft member 18 and a bearing member 17, and, the casing member 16 is freely rotated (swung) against the attachment member 19 around a vertical axis S. In other words, in the holder main body 1, the casing member 16 is freely rotatable against the attached member B around the vertical axis S.

The casing member 16 has a pair of left and right side wall portions 10, and a guiding groove 13 of convex arc shape inclined forward and downward in side view is formed on each of the pair of left and right side wall portions 10 to guide the slide roller 30. And, the casing member 16 has a half-divided construction provided with a first case half body 16A having one of the side wall portions 10 (side wall portion 10A) and a second case half body 16B having another of the side wall portions 10 (side wall portion 10B).

And, although not shown in figures, the guiding groove 13, inclined backward and downward, may be straight shape.

The main wheel supporting member 2 is provided with a pair of left and right supporting piece portions 21 each of which having a through hole to which the first pivot shaft 51 (not shown in FIG. 7) is inserted and a through hole to which the second pivot shaft 52 (not shown in FIG. 7) is inserted to be supported on both ends. And, the main wheel supporting member 2, having an upper wall portion 22 connecting upper portions of the supporting piece portions 21, is formed into inverted U-shaped as a whole.

The sub wheel supporting member 3 is provided with a pair of left and right side piece portions 31 each of which having a through hole to which the second pivot shaft 52 is inserted, a through hole to which the roller shaft 53 (not shown in FIG. 7) is inserted, and a through hole to support the pivot supporting shaft 58 (not shown in FIG. 7) on both ends. And, the sub wheel supporting member 3, having an upper wall portion 32 connecting upper portions of the side piece portions 31, is formed into inverted U-shaped as a whole.

The slide roller 30 is disposed on left and right positions out of the side piece portions 31 of the sub wheel supporting member 3, and attached to the both end portions of the roller shaft 53 as to freely rotate.

In FIG. 1 through FIG. 6, the side wall portion 10 on the left side of the holder main body 1 is cut, and the slide roller 30 shown with solid lines is guided by the guiding groove 13 formed on the cut side wall portion 10 not shown in figures.

In the elastic pushing member 9, an upper end portion (an end portion) 9a is attached to the front portion of the casing member 16, and a lower end portion (another end portion) 9b is disposed on an inner position of the pair of left and right side piece portions 31 of the sub wheel supporting member 3 and attached to the sub wheel supporting member 3 through the roller shaft 53. That is to say, the elastic pushing member 9 is kept inclined backward and downward and always elastically pushing the sub wheel supporting member 3 forward and upward.

The sub wheel supporting member 3 is elastically pushed forward and upward by the elastic pushing member 9 as to dispose the slide roller 30 on a forward upper end portion of the guiding groove 13 in normal running posture, and stopped on a predetermined waiting position by restriction of forward and upward oscillation by the upper wall portion 32 touching a buffer member 5 (not shown in FIG. 7) of rubber attached to the casing member 16.

And, in the sub wheel supporting member 3, the lower end of the sub wheel 8 is disposed with a predetermined height dimension from the flat face G in front of the stage on which the main wheel 7 grounds in normal running posture. The predetermined height dimension is set larger than the height dimension of the stage J (the stage end face Ja and the stage upper face Jb).

Next, the construction is explained along with the function of the stage-corresponding caster device of the present invention.

As shown in FIG. 1, when the attached member B such as a carriage receives operational force of a user for forward running, the main wheel 7 runs on the flat face G before the stage while the sub wheel 8 is keeping a predetermined height dimension. Approaching the stage J, the sub wheel 8 proceeds forward beyond the stage end face Ja without contact with the stage end face Ja.

Figure 2:
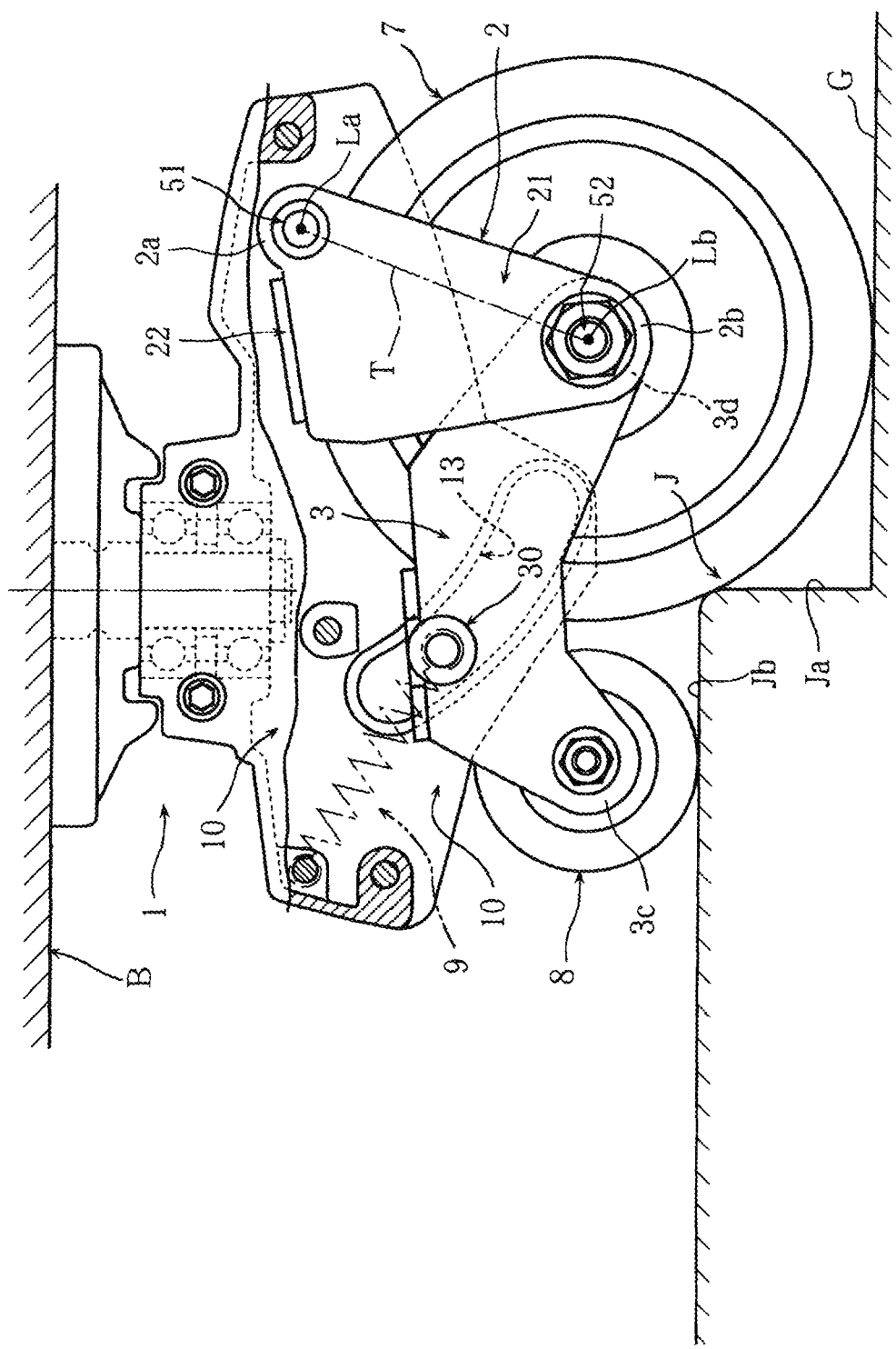
FIG. 2 A side view with cross section of principal portions in contact with a stage end face.

As shown in FIG. 2, although the attached member B and the holder main body 1 are moved forward by the operational force (forward progressive force) of the user when the main wheel 7 contacts the stage end face Ja, the main wheel 7 is stopped by the stage end face Ja.

As described above, observed from the holder main body 1 (in comparison with the normal running posture), the main wheel 7 is pushed by the stage end face Ja to move backward when the main wheel 7 contacts the stage end face Ja, and the lower portion 2b of the main wheel supporting member 2 oscillates backward around the first pivot axis La. The sub wheel supporting member 3, resisting the elastic pushing force of the elastic pushing member 9, is pulled by the main wheel supporting member 2, the second pivot shaft 52, and the main wheel 7, and the rear portion 3d moves backward. The slide roller 30, guided by the guiding groove 13, moves backward and downward. The front portion 3c of the sub wheel supporting member 3 is oscillated (moved) backward and downward by backward and downward arc-shaped movement of the slide roller 30 to push the sub wheel 8 to the stage upper face Jb.

Figure 3:
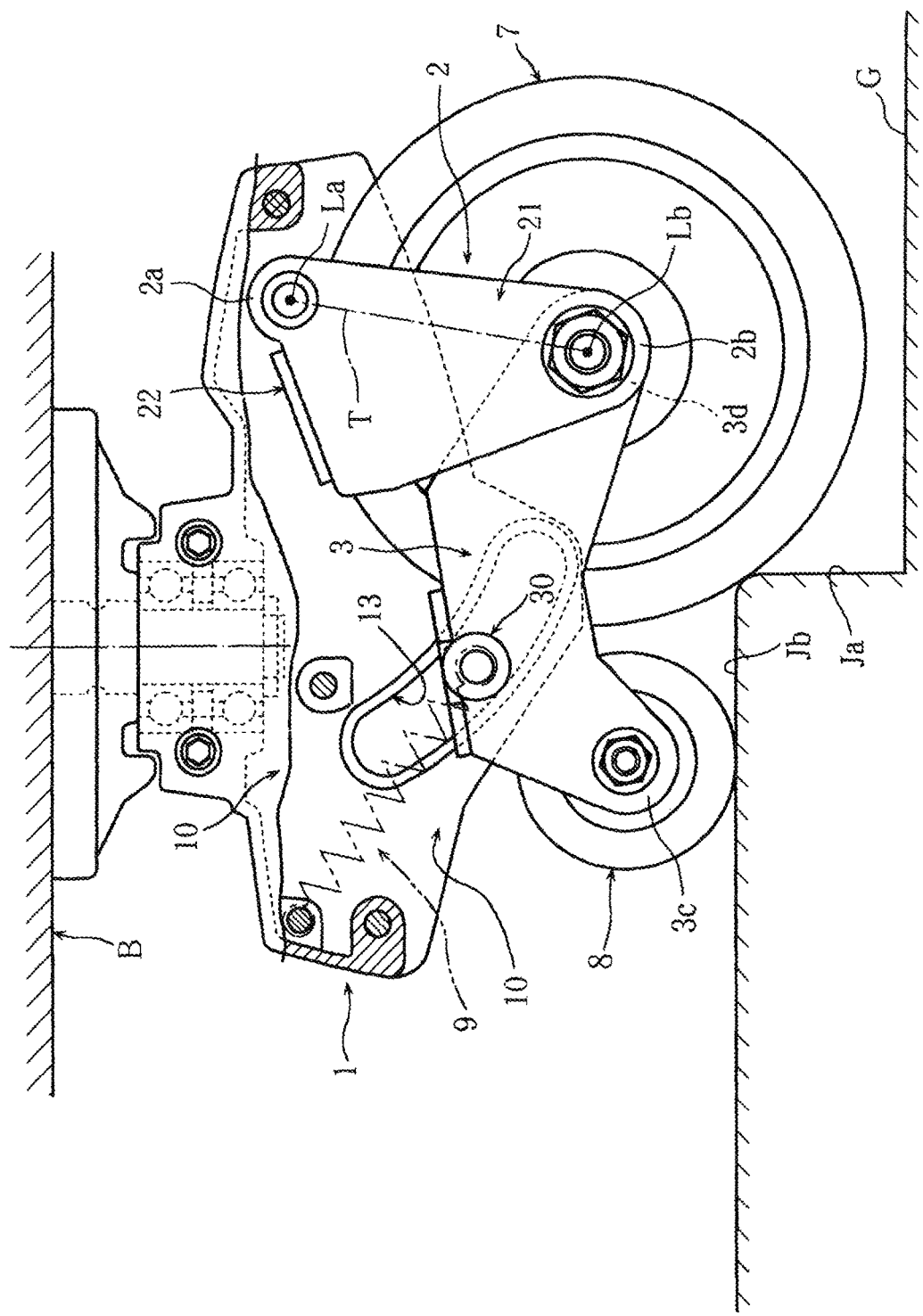
FIG. 3 A side view with cross section of principal portions when climbing over the stage end face.
Figure 4:
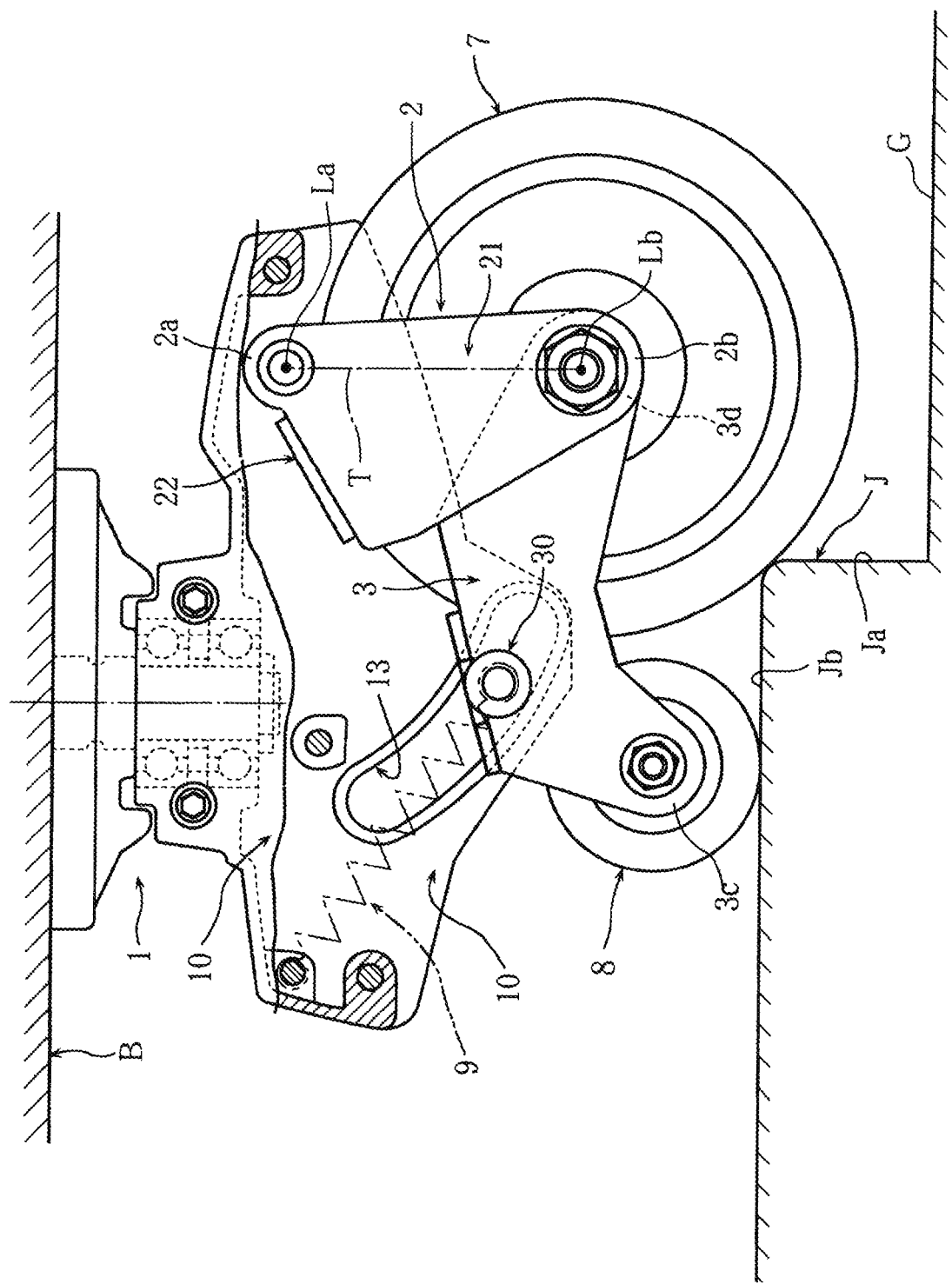
FIG. 4 A side view with cross section of principal portions when climbing over the stage end face.
Figure 5:
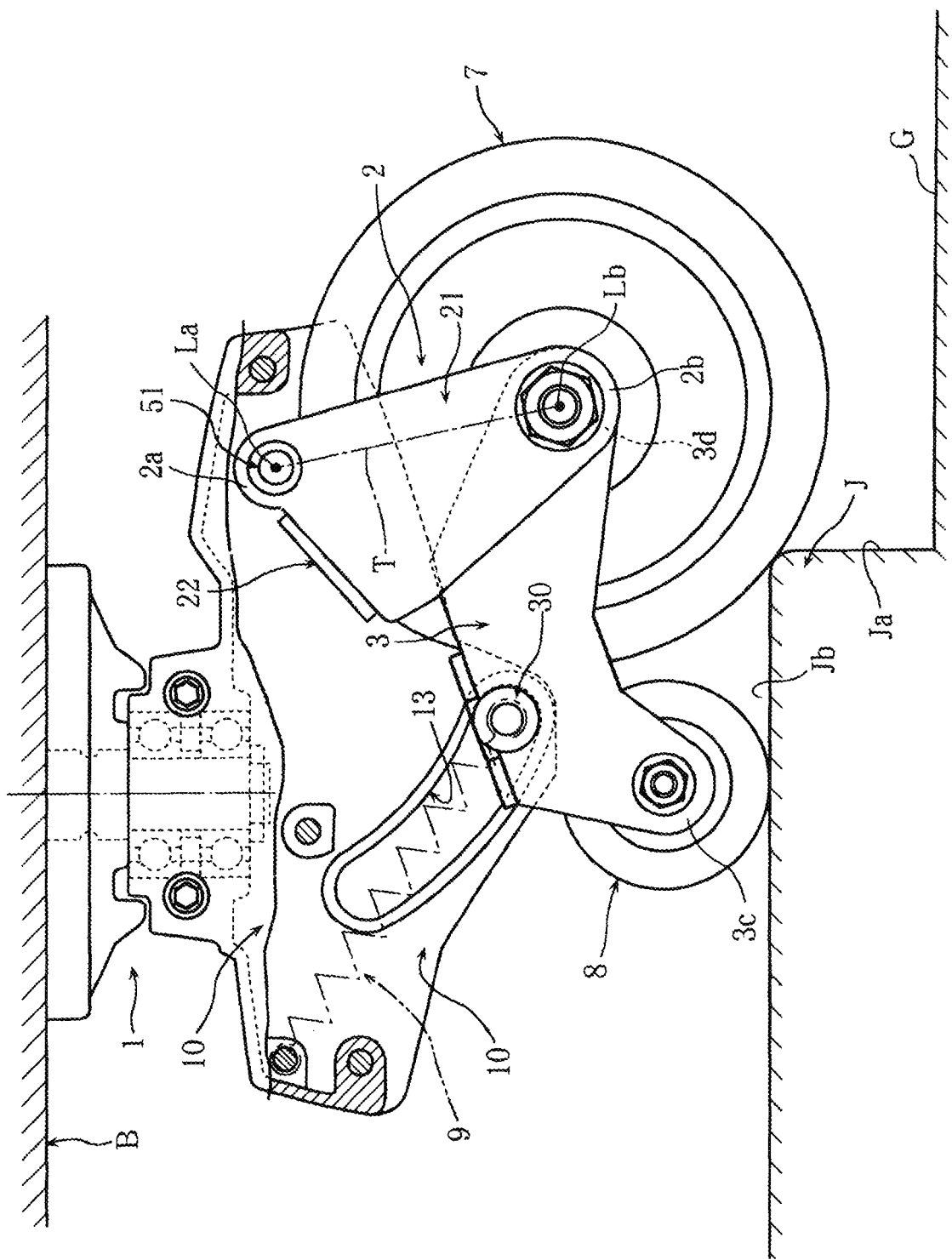
FIG. 5 A side view with cross section of principal portions when climbing over the stage end face.

Then, the attached member B and the holder main body 1 are moved forward further by the forward progressive force of the user, as serially shown in FIG. 3, FIG. 4, and FIG. 5, observed from the holder main body 1 (in comparison with the normal running posture), the main wheel 7 moves backward, the lower portion 2b of the main wheel supporting member 2 oscillates backward, the rear portion 3d of the sub wheel supporting member 3 moves backward, the slide roller 30 guided by the guiding groove 13 moves in arc to the rear lower end portion of the guiding groove 13, the front portion 3c of the sub wheel supporting member 3 is oscillated backward and downward, the sub wheel 8 is pressed to the stage upper face Jb by strong force, and the attached member B, the holder main body 1, the main wheel supporting member 2, and the main wheel 7 are pushed upward and forward (made floating).

That is to say, reaction force, generated by the contact of the main wheel 7 being moved forward by the forward progressive force from the user with the stage end face Ja, is converted to pushing force to push the stage upper face Jb with the sub wheel 8, and, reaction force generated when the sub wheel 8 pushes the stage upper face Jb is converted to pushing force to push the attached member B, the holder main body 1, the main wheel supporting member 2, and the main wheel 7 upward. The main wheel 7 climbs the stage end face Ja (the stage J) only by giving progressive force similar to that of normal running state even when the user does not give force to raise the attached member B.

Further, as serially shown in FIG. 3, FIG. 4, and FIG. 5, the main wheel 7 moves backward, the lower portion 2b of the main wheel supporting member 2 oscillates backward, and the oscillation standard line T in a forward and downward inclined posture is switched to a backward and downward inclined posture through a vertical posture. That is to say, the upper portion 2a of the main wheel supporting member 2 works as to push the holder main body 1 forward and upward to increase pushup effect.

Figure 6:
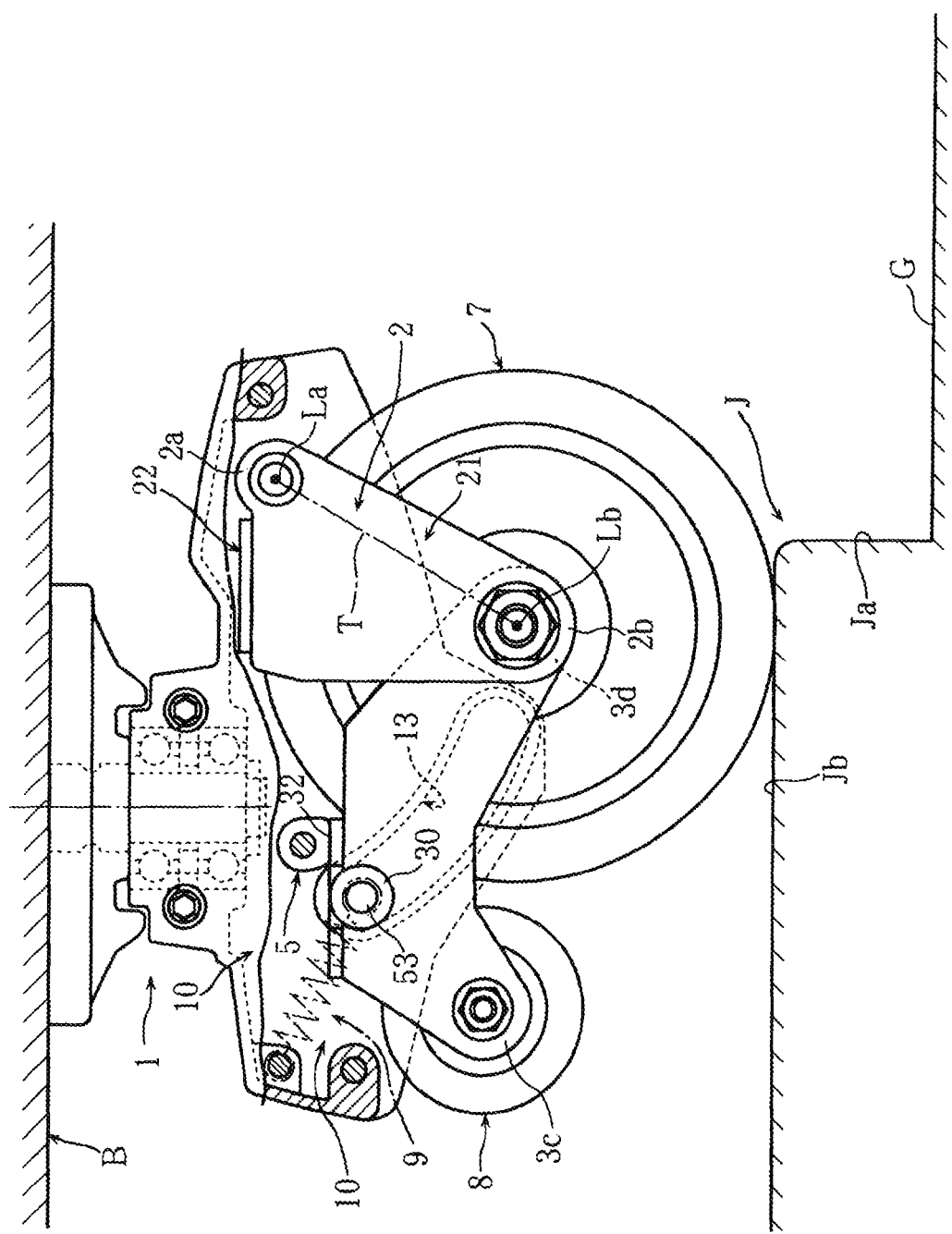
FIG. 6 A side view with cross section of principal portions when climbed over the stage end face.

Then, as shown in FIG. 6, when the main wheel 7 grounds on the stage upper face Jb, the sub wheel 8 parts from the stage upper face Jb, and, the sub wheel 8 and the sub wheel supporting member 3 oscillate to return to a predetermined waiting position.

In this return oscillation, the upper wall portion 32 of the sub wheel supporting member 3 contacts the buffer member 5, attached to the casing member 16 for restriction of upward oscillation, and stops on the predetermined waiting position. The stop by the buffer member 5, in comparison with, for example, stopping by contact of the slide roller 30 with an inner face of upper front end or the guiding groove 13, mitigates impact to prevent malfunction without damage and deformation of the slide roller 30 and the roller shaft 53.

In the present invention, being modifiable, the holder main body 1 may have a construction in which the attachment member 19 and the casing member 16 are unified (mutually not swinging), and the casing member 16 may be fixed to the attached member B as not to swing around the vertical axis S. That is to say, the stage-corresponding caster device of the present invention may be a swing type caster device or a fixed (non swing type) caster device. The casing member 16, although preferable to be formed by mold with resin or die cast, may be formed by combination of plate product (press-worked product) and resin molded product. The lower end portion 9b of the elastic pushing member 9 may be attached directly (without through the roller shaft 53) to the sub wheel supporting member 3. And, the attached member B is for running with wheels by manpower such as a carriage, a walking frame, a wheelchair, a shopping cart, etc.

As described above, with the stage-corresponding caster device of the present invention, the attached member B such as a carriage, a walking frame, a shopping cart, etc. and the main wheel 7 can be lifted by making the sub wheel 8 contact the stage upper face Jb with strong force because the stage-corresponding caster device, having the sub wheel which contacts the stage upper face Jb when the main wheel 7 contacts the stage end face Ja, is provided with the holder main body 1 attached to the attached member B and having the pair of left and right side wall portions 10, the main wheel supporting member 2 in which the main wheel 7 is pivoted to the lower portion 2b and the upper portion 2a is pivoted to the holder main body 1, the sub wheel supporting member 3 in which the sub wheel 8 is pivoted to the front portion 3c and the rear portion 3d is pivoted to the main wheel supporting member 2 coaxially with the main wheel 7, and the slide roller 30 attached to the sub wheel supporting member 3 on the forward position to the main wheel 7; and, the holder main body 1 has the guiding groove 13 inclined backward and downward in side view on the side wall portion 10 to guide the slide roller 30, the main wheel supporting member 2 is oscillated backward and the sub wheel supporting member 3 is moved backward by contact of the main wheel 7 with the stage end face Ja, the slide roller 30 is guided by the guiding groove 13 to oscillate the front portion 3c of the sub wheel supporting member 3 downward, the sub wheel 8 is pressed to the stage upper face Jb, and the main wheel 7 climbs over the stage end face Ja. Therefore, the user doesn't need to run and lift up the attached member B with strong force, and the attached member can get over the stage end face Ja efficiently with small force (easily and lightly). The device, showing sufficient pressing force to get over the stage, can be made compact with short longitudinal dimension of the entire device because the up and down movement amount of the sub wheel 8 can be increased with decreasing the back and forth movement amount of the main wheel supporting member 2 and the sub wheel supporting member 3. Stable stage climbing function can be obtained with smooth movement of the main wheel 7 and the sub wheel 8 without generating torsion (twist) even in a case that the main wheel 7 is inclined against the stage end face Ja in top view (the main wheel 7 doesn't contact at right angles with the stage end face Ja in top view). And, this mechanism has high degree of freedom in design, and a stage-corresponding caster device appropriate for the customer's needs such as the size of the main wheel 7, etc. can be easily obtained.

And, pushup (floating) function of the attached member 13 and the holder main body 1 by the sub wheel 8 can be assisted (increased) to easily and lightly climb over the stage end face Ja because in a normal running posture in which the main wheel 7 does not contact the stage end face Ja, the first pivot axis La on the pivoted portion of the main wheel supporting member 2 and the holder main body 1 is disposed on the rear and upper position to the second pivot axis Lb on the pivoted portion of the main wheel supporting member 2 and the main wheel 7 to make the oscillation standard line T, connecting the first pivot axis La and the second pivot axis Lb in side view, in the forward and downward inclined posture; and the oscillation standard line T in the forward and downward inclined posture is switched to the backward and downward inclined posture through the vertical posture when the main wheel 7 contacts and climbs over the stage end face Ja.

The main wheel 7 and the main axle (second pivoted shaft) 52, on which strong outer force (collision force with the stage end face Ja) works, can be freely oscillated as a beam strongly-held on the both sides, and stage climbing effect can be smoothly and stably shown in the backward oscillation when the main wheel 7 contacts the stage end face Ja because the main wheel supporting member 2 is inverted U-shaped having the pair of left and right supporting piece portions 21 to which the main wheel 7 is pivoted, and the upper wall portion 22 connecting upper portions of the pair of left and right supporting piece portions 21. Especially, in case that the main wheel 7 is inclined against the stage end face Ja in top view (the main wheel 7 doesn't contact at right angles with the stage end face Ja in top view), the main wheel 7 and the main axle (second pivoted shaft) 52 can be certainly and smoothly oscillated backward without generating torsion (twist).

And, large up and down movement amount can be obtained even when the left and right movement amount of the slide roller 30 is slight, and the longitudinal dimension of the holder main body 1 (casing member 16) can be compact because the guiding groove 13 is formed in an arc shape convex forward and downward in side view. And, the stage upper face Jb can be pressed with strong force and its reaction force is sufficiently strong, and the attached member B can be pushed up with strong force. The front portion 3c of the sub wheel supporting member 3, along with the backward oscillation of the main wheel 7, can be smoothly and stably oscillated without generating torsion (twist) and stage climbing effect is certainly shown.

EXPLANATION OF THE MARKS

1 A holder main body
2 A main wheel supporting member
2a An upper portion
2b A lower portion
3 A sub wheel supporting member
3c A front portion
3d A rear portion
7 A main wheel
8 A sub wheel
10 A side wall portion
13 A guiding groove
21 A supporting piece portion
22 An upper wall portion
30 A slide roller
B An attached member
Ja A stage end face
Jb A stage upper face
La A first pivot axis
Lb A second pivot axis
T An oscillation standard line

The invention claimed is:

1. A stage-corresponding caster device provided with a sub wheel (8) which contacts a stage upper face (Jb) when a main wheel (7) contacts a stage end face (Ja) characterized by that:
   a holder main body (1) attached to an attached member M and having a pair of left and right side wall portions (10), a main wheel supporting member (2) in which the main wheel (7) is pivoted to a lower position (2b) and an upper position (2a) is pivoted to the holder main body (1), a sub wheel supporting member (3) in which the sub wheel (8) is pivoted to a front position (3c) and a rear position (3d) is pivoted to the main wheel supporting member (2) coaxially with the main wheel (7), and a slide roller (30) attached to the sub wheel supporting member (3) on a forward position to the main wheel (7), are provided; and
   the holder main body (1) has a guiding groove (13) inclined backward and downward from the sub wheel (8) side to the main wheel (7) side inside view on the side wall portion (10) to guide the slide roller (30), the main wheel supporting member (2) is oscillated backward against a running direction of the main wheel (7) and the sub wheel supporting member (3) is moved backward against a running direction of the sub wheel (8) by contact of the main wheel (7) with the stage end face (Ja), the slide roller (30) is guided by the guiding groove (13) to oscillate the front portion (3c) of the sub wheel supporting member (3) downward, the sub wheel (8) is pressed to the stage upper face (Jb), and the main wheel (7) climbs over the stage end face (Ja) when the slide roller (30) moves to the rear lower end portion of the guiding groove (13).

2. The stage-corresponding caster device as set forth in claim 1, wherein, in a normal running posture in which the main wheel (7) does not contact the stage end face (Ja), a first pivot axis (La) on a pivoted portion of the main wheel supporting member (2) and the holder main body (1) is disposed on a rear and upper position to a second pivot axis (Lb) on a pivoted portion of the main wheel supporting member (2) and the main wheel (7) to make an oscillation standard line (T), which connects the first pivot axis (La) and the second pivot axis (Lb) in side view, in a forward and downward inclined posture along the radius of the main wheel (7); and
   the oscillation standard line (T) in the forward and downward inclined posture along the radius of the main wheel (7) is switched to a backward and downward inclined posture along the radius of the main wheel (7) through a vertical posture when, the main wheel (7) contacts and climbs over the stage end face (Ja).

3. The stage-corresponding caster device as set forth in claim 1, wherein the main wheel supporting member (2) is an inverted U-shaped having a pair of left and right supporting piece portions (21) to which the main wheel (7) is pivoted, and an upper wall portion (22) connecting upper portions of the pair of left and right supporting piece portions (21).

4. The stage-corresponding caster device as set forth in claim 1, wherein the guiding groove (13) is formed in an arc shape convex forward and downward from the main wheel (7) side to the sub wheel (8) side in side view.

* * * * *